(12) United States Patent
Wirth et al.

(10) Patent No.: US 10,322,705 B2
(45) Date of Patent: Jun. 18, 2019

(54) PRESSURE TAPPING DEVICE AND MOTOR VEHICLE HAVING A PRESSURE TAPPING DEVICE, AND PRESSURE TAPPING METHOD

(71) Applicant: Ford Global Technologies, LLC, Dearborn, MI (US)

(72) Inventors: Martin Wirth, Remscheid (DE); Oliver Berkemeier, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/723,527

(22) Filed: Oct. 3, 2017

(65) Prior Publication Data
US 2018/0105155 A1  Apr. 19, 2018

(30) Foreign Application Priority Data
Oct. 14, 2016  (DE) .................. 10 2016 220 037

(51) Int. Cl.
*F02D 9/02* (2006.01)
*B60T 13/57* (2006.01)
*B60T 17/02* (2006.01)
*F02M 35/10* (2006.01)

(52) U.S. Cl.
CPC .............. *B60T 13/57* (2013.01); *B60T 17/02* (2013.01); *F02D 9/02* (2013.01); *F02M 35/10229* (2013.01); *F02D 2009/024* (2013.01); *F02D 2200/0406* (2013.01)

(58) Field of Classification Search
CPC ....... F02D 13/04; B60W 10/06; B60W 10/18; B60W 2540/12; B60W 10/188; B60W 2510/069; B60W 2510/182; B60W 2710/18; B60W 30/18109; B60W 30/18136
See application file for complete search history.

(56) References Cited

U.S. PATENT DOCUMENTS

| | | | |
|---|---|---|---|
| 6,176,556 B1 * | 1/2001 | Kizer ................... | B60T 1/10 303/114.3 |
| 8,522,546 B2 * | 9/2013 | Gray, Jr. ............... | B60T 13/143 60/413 |
| 9,114,785 B2 * | 8/2015 | Sokou .................. | B60T 7/042 |
| 9,273,651 B2 | 3/2016 | Pursifull et al. | |
| 2002/0029945 A1 * | 3/2002 | Hackl ................... | B60T 8/328 188/348 |

(Continued)

FOREIGN PATENT DOCUMENTS

DE   102010002429 A1   9/2011
EP       2876352 A1   5/2015

*Primary Examiner* — Long T Tran
(74) *Attorney, Agent, or Firm* — Julia Voutyras; McCoy Russell LLP

(57) ABSTRACT

Methods and systems are provided for a pressure tapping device for a motor vehicle where a portion of the pressure energy generated at the fuel storage reservoir is transmitted to a working medium, physically separate from the fuel via the pressure tapping device. The pressure tapping device is fluidically coupled to a pressure actuator and enables the pressure operation via transmission of the pressure energy and adjustment of valves diverting flow from the fuel storage reservoir to the engine intake through the pressure tapping device.

16 Claims, 4 Drawing Sheets

(56) References Cited

U.S. PATENT DOCUMENTS

| | | | | |
|---|---|---|---|---|
| 2005/0011185 A1* | 1/2005 | Annoura | ............. | F02D 41/0032 60/289 |
| 2010/0078253 A1* | 4/2010 | Rolfe | ................... | B60H 1/3202 180/302 |
| 2010/0154408 A1* | 6/2010 | Anderson | ............... | B60T 7/042 60/556 |
| 2014/0261328 A1* | 9/2014 | McAlister | ............... | F02B 21/00 123/446 |
| 2015/0073675 A1* | 3/2015 | Malone | ................. | B60W 10/06 701/70 |
| 2016/0116571 A1* | 4/2016 | De Wilde | ............ | G01S 13/886 342/20 |

* cited by examiner

PRESSURE TAPPING DEVICE AND MOTOR VEHICLE HAVING A PRESSURE TAPPING DEVICE, AND PRESSURE TAPPING METHOD

CROSS-REFERENCE TO RELATED APPLICATION

This application claims priority to German Patent Application No. 102016220037.2, filed Oct. 14, 2016. The entire contents of the above-referenced application are hereby incorporated by reference in its entirety for all purposes.

FIELD

The disclosure relates to a pressure tapping device for operating vacuum-actuated devices.

BACKGROUND/SUMMARY

Vacuum may be generated during throttled engine operation but the operation of turbochargers may, however, reduce the amount of vacuum delivered to the intake manifold of the engine. Thus systems that may generate vacuum for other vehicle applications that rely on low pressure actuation without compromising the efficiency of the engine are desirable. DE 102014222714 A1 discloses the possibility of vehicle systems comprising various vacuum consumer devices which are actuated by means of a vacuum. This includes a brake booster, for example. The vacuum used by these devices may be provided by a special vacuum pump. In further embodiments one or more aspiration devices may be incorporated into the engine system which are capable of utilizing the air flow in the engine and using it to generate a vacuum.

The inventors herein have recognized potential issues with such systems. In one example, vacuum pumps may be parasitic and result in energy waste. As another example, vacuum pumps may increase the packaging space of the engine and increase the cost and complexity of the vehicle.

Accordingly, the inventors herein propose an approach to at least partly address the above issues. In one example, a pressure tapping device may include a fluid-carrying connection to a fuel line and may be configured to transmit a proportion of pressure energy of the fuel to a working medium, physically separate from the fuel. The pressure tapping device, according to the disclosure, may be used in a motor vehicle which comprises an internal combustion engine and a fuel storage reservoir connected to the internal combustion engine by a fuel line, wherein the fuel may be stored in the fuel storage reservoir at a storage pressure greater than an ambient pressure and thereby possesses pressure energy. According to the disclosure the pressure tapping device has a fluid-carrying connection to the fuel line and is configured to transmit a proportion of the pressure energy of the fuel to a working medium, physically separate from the fuel. The pressure tapping device advantageously allows use to be made of the pressure energy inherent in fuel that is stored under pressure, such as compressed natural gas (CNG), for example.

In one example of the pressure tapping device according to the disclosure, the device may comprise an admission line with an admission line pressure control valve and a discharge line with a discharge line valve. This makes it possible to feed fuel through the pressure tapping device and to limit the minimum and maximum working pressure. In another example of the pressure tapping device, the device comprises a pressure transmitter, including a first cylinder with a first piston and a second cylinder with a second piston having a fluid-carrying connection to the first cylinder. A transmission fluid is located between the first piston and the second piston. The admission line and the discharge line have a fluid-carrying connection to the first cylinder.

The pressure tapping device according to the disclosure may be integrated into a motor vehicle. The motor vehicle comprises an internal combustion engine and a fuel storage reservoir connected to the internal combustion engine by a fuel line. The fuel may be stored in the fuel storage reservoir at a storage pressure greater than an ambient pressure and thereby possesses pressure energy. Here the pressure tapping device has a fluid-carrying connection to the fuel line. The motor vehicle may be operated more efficiently with the pressure tapping device since conventional devices, such as pressure pumps and their drive, can be eliminated.

In another example of the motor vehicle, according to the present disclosure, the pressure tapping device is connected to a pressure-operated actuator of the motor vehicle. The actuator can therefore be operated by the pressure energy obtained from the fuel. The pressure-operated actuator may be, in this example, a brake booster. A greater pressure differential can be generated in the brake booster by the pressure tapping device than by a vacuum pump. This allows a greater boost for the same brake booster design size.

In another example, a method for operating a vehicle with a pressure tapping device includes supplying fuel to an engine from a fuel storage reservoir via a fuel line and transferring pressure energy from the fuel storage reservoir to a brake booster by the pressure tapping device. In one example, the method may further include opening an admission line pressure valve. By opening the admission line pressure valve in the admission line, fuel is diverted to the pressure tapping device, thereby transmitting a portion of the pressure energy to the brake booster via a working fluid housed within the pressure tapping device. The working fluid is then depressurized by opening the discharge line valve disposed in the discharge line which then flows fuel from the pressure tapping device to the fuel line. Use is thereby made of pressure energy derived from the fuel pressure.

In an example of the pressure tapping method according to this disclosure, an actuator of the motor vehicle is operated by the pressure energy of the working medium. In particular, a brake booster is operated. In this way, the actuator is operated by the pressure energy obtained from the fuel. In brake-boosting, greater brake power assistance can be achieved than in conventional vacuum methods.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In the global effort to reduce carbon dioxide emissions, spark ignited engines running on compressed natural gas (CNG), as an alternative to conventional gasoline, are expected to contribute significantly to this endeavor. The concept of a CNG-fueled engine coupled with a turbocharger and relying on direct injection of the fuel is an attractive configuration for consumers. For a CNG tank of appropriate dimensions for onboard vehicle use, the tank may be pressurized to 300 bar to provide a reasonable driving range per tank of gas. This pressure may be reduced to around 30 bar for subsequent injection into the cylinders which, as a result, may represent wasted potential energy. Ideally, this energy, henceforth referred to as pressure energy, may be captured and directed toward another energy-consuming application for engine operation.

Applications which may benefit from the capture of the pressure energy may include systems that utilize differences in pressure. As such, the pressure differentials involved in the CNG/fuel injection system may be used for a vacuum-actuated process. The following description relates to systems and methods for a pressure tapping device in arranged in the drive unit of a motor vehicle. An example of a motor vehicle with a drive unit and engine is given in FIG. 1. The motor vehicle includes a fuel storage reservoir that may store a gas, such as natural gas, at a pressure higher than an ambient pressure. A detailed depiction of the arrangement of the pressure tapping device within the drive unit of the motor vehicle is shown in FIG. 2. The elements involved in transmitting pressures and generating pressure differentials are given in relation to gas flow from the CNG tank to the engine. A flowchart describing the steps involved in the operation of the pressure tapping device and the thresholds enabling actuation of a brake booster is given in FIGS. 3A-3B.

Figure 1:
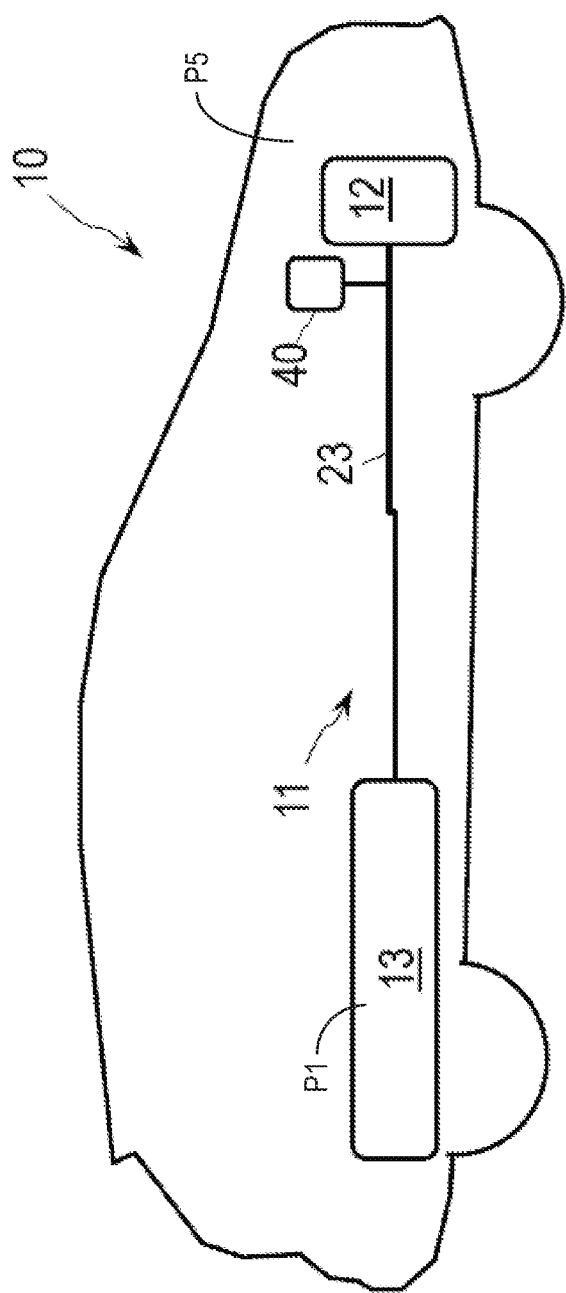
FIG. 1 schematically shows an exemplary motor vehicle equipped with an internal combustion engine and fuel storage reservoir.
Figure 2:
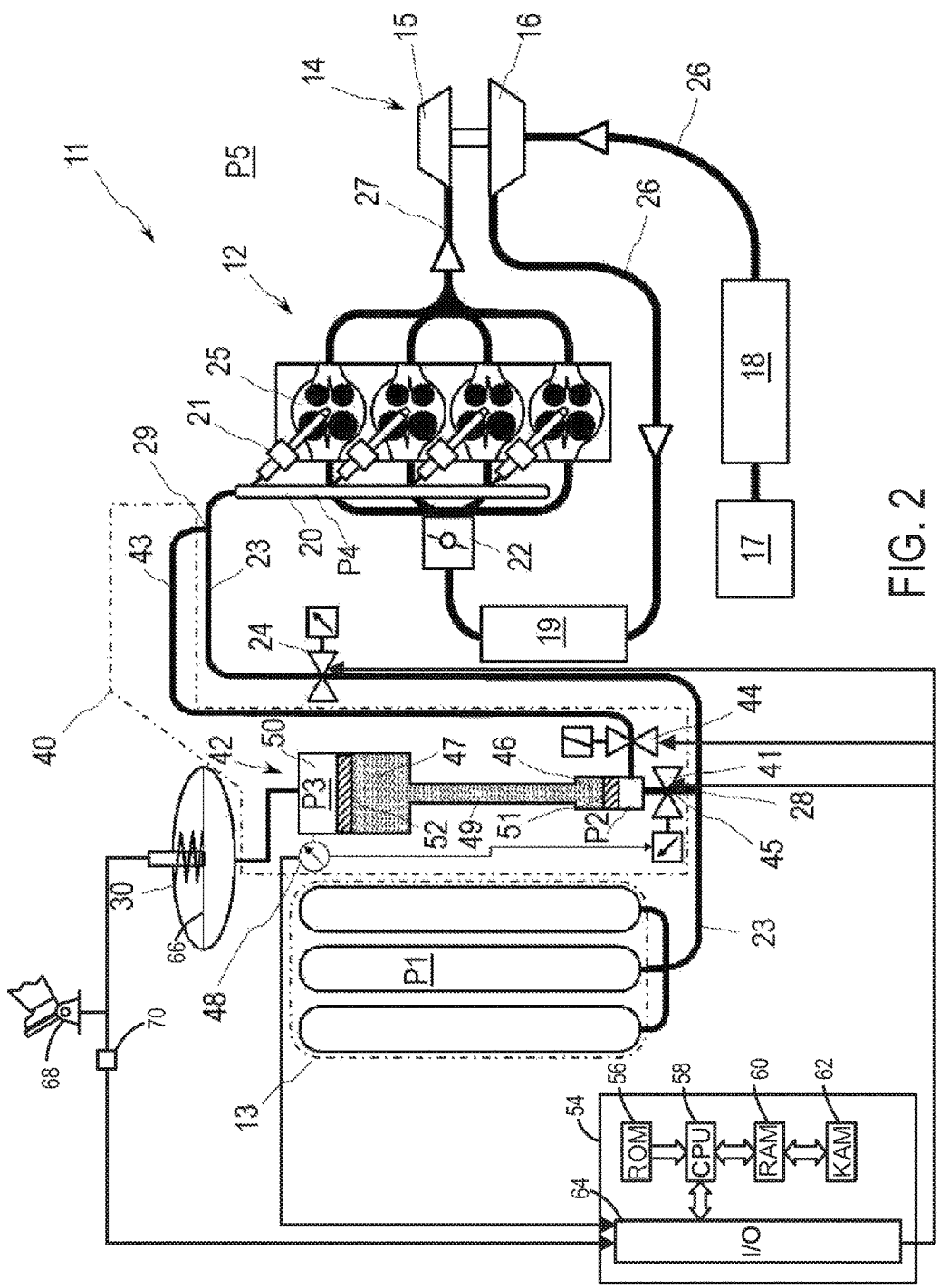
FIG. 2 schematically shows a first embodiment of a pressure tapping device arranged in drive unit of a motor vehicle.

Turning now to FIG. 1, a schematic representation of an exemplary motor vehicle 10 is shown. The motor vehicle 10 comprises a drive unit 11 with an internal combustion engine 12 utilizing fuel. The fuel may be a gas, such as natural gas (CNG) or methane or the like. For storing the fuel, the motor vehicle 10 comprises a fuel storage reservoir 13, which is configured to store fuel at a storage pressure P1 greater than an ambient pressure P5. The storage pressure P1 is between 50 bar and 300 bar, for example. The pressure differential relative to ambient pressure gives the stored fuel a specific pressure energy. For delivering the fuel to the internal combustion engine 12, the fuel storage reservoir 13 has a fluid-carrying connection to the internal combustion engine 12 via a fuel line 23. The motor vehicle 10 according to the disclosure comprises a pressure tapping device 40, which is coupled to the fuel line 23.

FIG. 2 shows the pressure tapping device 40 in more detail in a first embodiment together with a drive unit 11. The drive unit 11 comprises an inlet air tract 26, at the start of which an air filter 17 is arranged, for supplying the internal combustion engine 12 with inlet air. A mass air flow sensor 18 is arranged downstream of the air filter 17. The internal combustion engine 12 may be fluidically coupled to a compressor 16 for compressing the inlet air. The compressor 16 is, in particular, part of a turbocharger 14, which furthermore comprises an exhaust-gas turbine 15 arranged in an exhaust tract 27 of the motor vehicle 10 and having a torque-transmitting connection (e.g., shaft) to the compressor 16. Downstream of the compressor 16, a charge-air cooler 19 is arranged in the inlet air tract 26 for cooling the compressed inlet air. The inlet air tract 26 is moreover provided with a throttle valve 22 arranged downstream of the charge-air cooler 19 for controlling the mass air flow of inlet air.

For supplying the internal combustion engine 12 with fuel, the exemplary internal combustion engine 12 includes an injector 21 for each of a plurality of working chambers 25 (also referred to as combustion chambers or cylinders). The internal combustion engine 12 shown thereby has direct fuel injection. The injector 21 receives the fuel from a fuel rail 20, which is formed at the end of a fuel line 23. In the fuel rail 20, the fuel has a fuel rail pressure P4 which is less than a storage pressure P1 of a fuel storage reservoir 13. The pressure differential between the storage pressure P1 and the fuel rail pressure P4 is useful because, on the one hand, the fuel rail pressure P4 is set so that an optimum injection operation is achieved. On the other hand, the storage pressure P1 is greater than the fuel rail pressure P4 and here is accounted for by the mass of fuel that may be stored. The pressure differential between the storage pressure P1 and the fuel rail pressure P4 gives the fuel at the storage pressure P1 its pressure energy. For controlling the fuel rail pressure P4, a fuel line pressure control valve 24 is arranged in the fuel line 23 upstream of the fuel rail 20.

The pressure tapping device 40 is arranged downstream of the fuel storage reservoir 13 and upstream of the fuel rail 20 and is coupled to the fuel line 23 at a set of branch points 28 and 29. At a first branch point 28, at least a portion of the fuel may be led out of the fuel line 23 into the pressure tapping device 40 and at a second branch point 29, the fuel may be led out of the pressure tapping device 40 into the fuel line 23. Thus the pressure tapping device 40 comprises an admission line 45 for connection to the first branch point 28, and a discharge line 43 for connection to the second branch point 29. In the motor vehicle 10, the admission line 45 is formed together with the discharge line 43 as a tract running parallel to the fuel line 23 and forms a bypass around a fuel line pressure control valve 24. Thus the first branch point 28 is situated in the fuel line 23 upstream of the fuel line pressure control valve 24 and the second branch point 29 is situated in the fuel line 23 downstream of the fuel line pressure control valve 24. An admission line pressure control valve 41, which is formed in the same way as the fuel line pressure control valve 24, is arranged in the admission line 45. A discharge line valve 44, which in one example may be an On-/Off switch, is arranged in the discharge line 43.

The pressure tapping device 40, according to this disclosure, comprises a pressure transmitter 42, which comprises a set of two interconnected cylinders 46 and 47. A first piston 51 is arranged in the first cylinder 46 and a second piston 52 is arranged in the second cylinder 47. A transmission fluid 49, which couples first and second pistons 51 and 52 hydraulically together, is located between the first piston 51 and the second piston 52. The first piston 51 may have a smaller cross sectional area and a smaller piston surface than the second piston 52, as shown in FIG. 2. The pressure transmitter 42 is thereby embodied as a hydraulic booster.

The pressure transmitter 42 is configured so that pressure energy of the fuel can be transmitted to the first piston 51. For this purpose the first cylinder 46 has a fluid-carrying connection to the admission line 45 and to the discharge line 43. The introduction of fuel into the first cylinder 46 generates an intermediate pressure P2, which may be transmitted from the first piston 51 to the second piston 52. The admission line pressure control valve 41 and the discharge line valve 44 may be actuated in order to adjust the intermediate pressure P2. The second piston 52 acts on a working medium 50. The pressure tapping device 40 is configured to transmit pressure energy originating from the fuel to the working medium 50, so that the working medium 50 has a desired working pressure P3 which is greater than an ambient pressure P5. The working pressure P3 may be 1 bar greater than the ambient pressure P5 in one example. The pressure transmitter 42 is configured in the way shown so as to keep the fuel physically separate from the working medium 50.

For measuring the working pressure P3, the pressure tapping device 40 is provided with a manometer 48. The manometer 48 may be connected to the admission line pressure control valve 41 via a control line, allowing the position of the admission line pressure control valve 41 to be adjusted as a function of the current working pressure P3. The position of the discharge line valve 44 may also be adjusted as a function of the current working pressure P3. In one example, a controller 54 may be provided for controlling the valves 41 and 44.

Controller 54 may be a conventional microcomputer including: microprocessor unit 58, input/outports 64, read-only memory 56, random access memory 60, keep alive memory 62, and a conventional data bus. Controller 54 is shown receiving a signal the manometer 48 for sensing the working pressure P3. Upon receiving the signal from manometer 48, controller 54 send signals to the admission line pressure control valve 41 and the discharge line valve 44 to actuate opening or closing of the valves. As described above, opening admission line pressure control valve 41 allows transfer of pressure across the pressure transmitter 42, resulting in a working pressure P3 generated at the working medium 50.

The working medium 50 may be liquid or gaseous. The pressure tapping device 40 is configured to supply the pressure energy of the working medium 50 to at least one pressure-operated actuator 30 of the motor vehicle 10. For this purpose, the pressure tapping device 40 has a pressure-transmitting (e.g., a fluid-carrying) connection to the actuator 30. In one such example, the actuator 30 may be a brake booster which is configured to use pressure energy in order to boost a brake pedal force. The actuator 30, as a brake booster, may therefore include a diaphragm 66 that divides the chamber of the brake booster into smaller chambers which may hold different pressures relative to one another.

The motor vehicle 10 according to this disclosure is configured to perform the pressure tapping method in which a proportion of the pressure energy of the fuel is transmitted to the working medium 50. The pressure tapping method may be initiated by the pressing of a brake pedal 68 which may be detected by a brake sensor 70 that is in electronic communication with the controller 54. The controller 54 sends signals to the admission line pressure valve 41 and the fuel line pressure control valve 24. Through at least a partial opening of the admission line pressure valve 41 and/or at least a partial closure of the fuel line pressure control valve 24, a proportion of the fuel may be led into the first cylinder 46 of the pressure transmitter 42. A desired intermediate pressure P2 may thereby be generated in the first cylinder 46. The intermediate pressure P2 bears on the first piston 51 and is transmitted to the second piston 52 in the second cylinder 47. If the intermediate pressure P2 is to be reduced, the discharge line valve 44 may be opened and the fuel fed through the discharge line 43 back to the fuel line 23 downstream of the fuel line pressure control valve 24. At the same time the admission line pressure valve 41 may be at least partially closed. In this way, the intermediate pressure P2 may be adjusted by opening and closing of the discharge line valve 44, the fuel line pressure control valve 24, and the admission line pressure valve 41.

The working medium 50 is used, in particular, for controlling the actuator 30 of the motor vehicle 10 by generating a pressure differential. An actuator 30 embodied as a brake booster may be operated by the working medium 50. Here, as in conventional brake boosters, a higher pressure is generated in a pedal chamber than in a brake cylinder chamber (not shown). In contrast to the conventional method, however, a pressure lower than the ambient pressure is not generated in the brake cylinder chamber, a pressure in excess of the ambient pressure P5 instead being generated in the pedal chamber. In particular, the excess pressure is 1 bar greater than the ambient pressure P5. To return the actuator 30 to a resting mode, the working pressure P3 is reduced by at least partially opening the discharge line valve 44 and feeding the fuel into the fuel line 23. In this way, the brake booster is activated by transmitting the intermediate pressure P2 obtained from the pressure P1 at the fuel storage tank 13 via the fluidly connected set of cylinders 46 and 47, generating a pressure differential that actuates the brake booster without an artificially created vacuum.

Figure 3A:
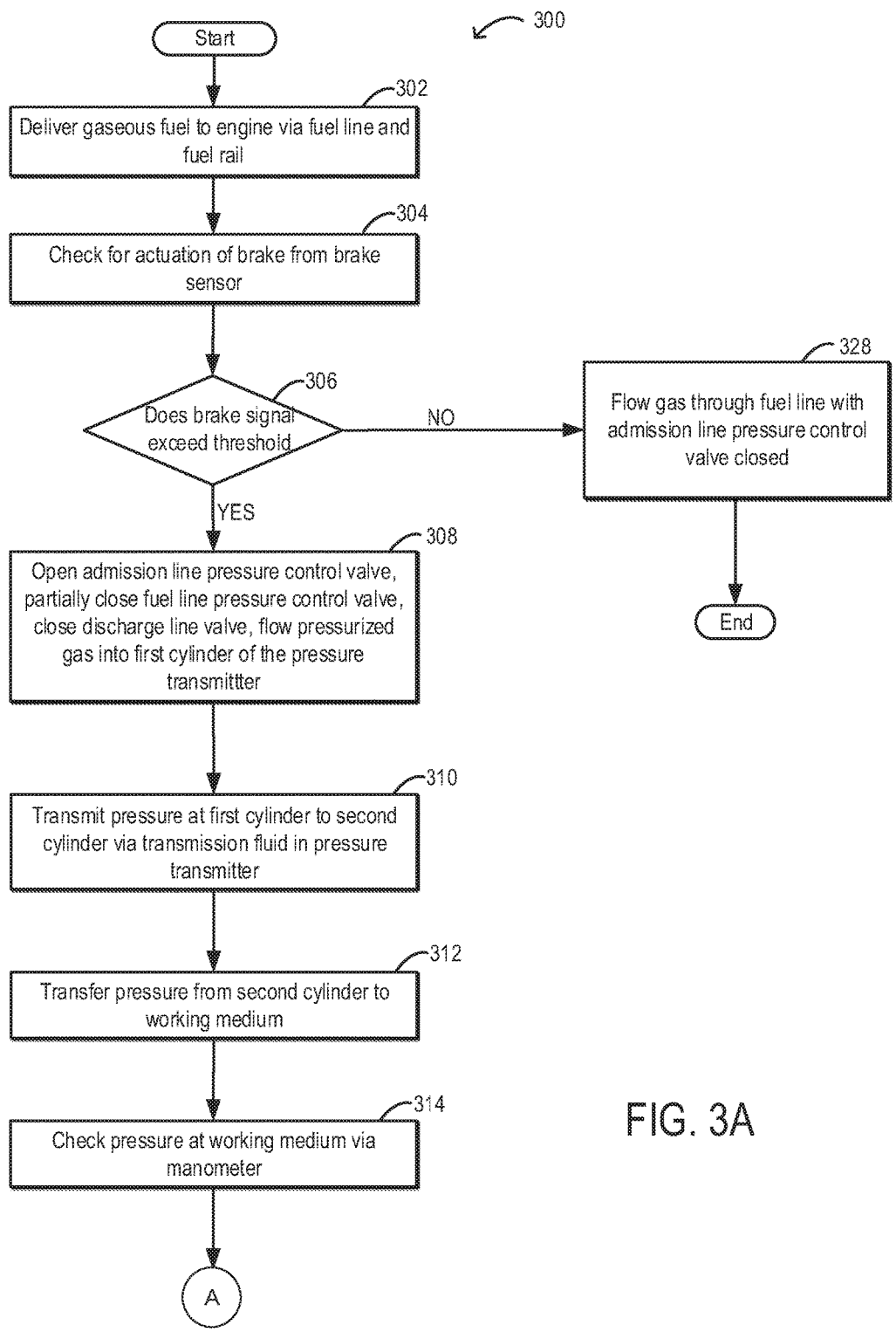
FIGS. 3A-3B are a flowchart illustrating a method for operating a pressure tapping device.
Figure 3B:
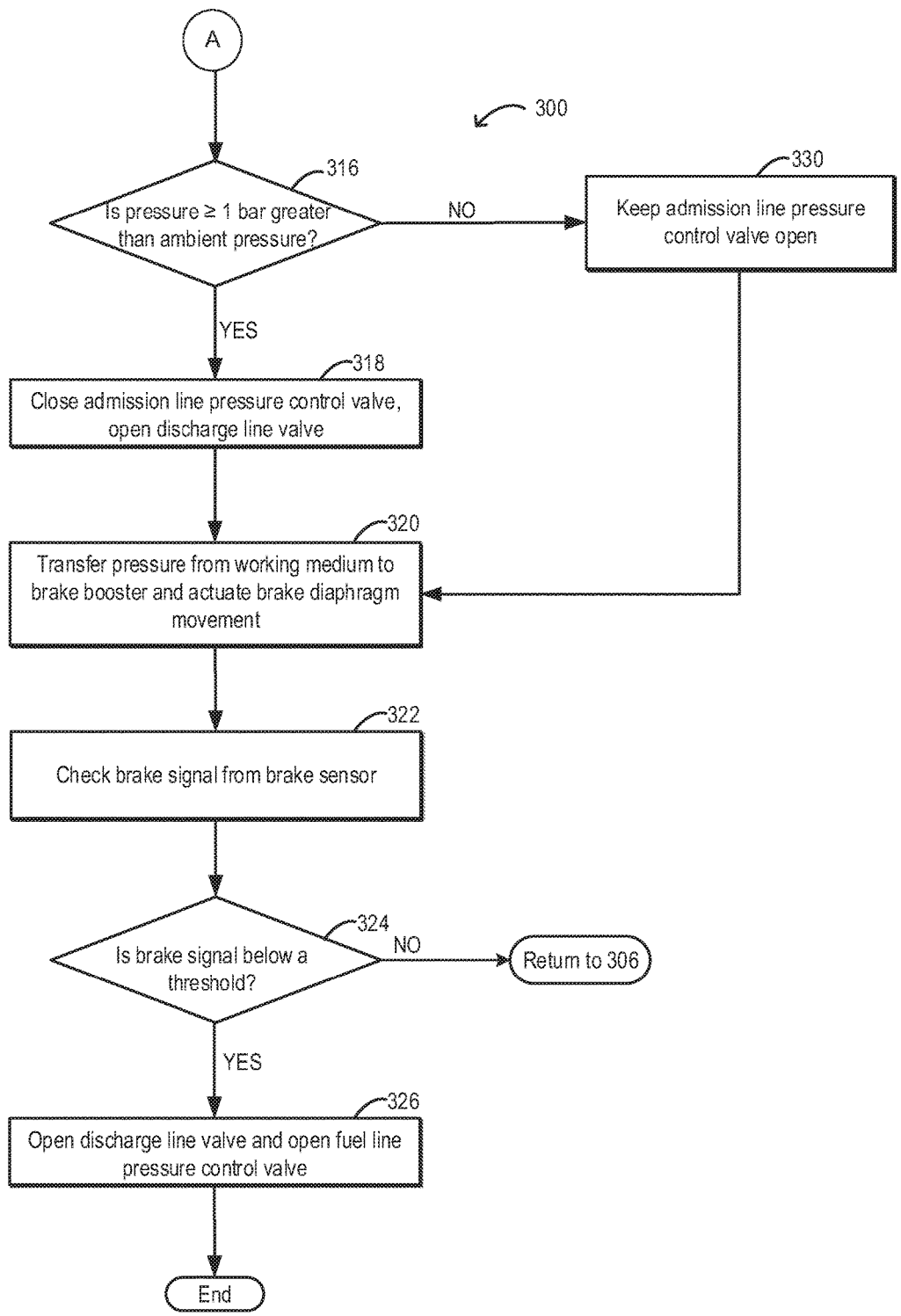

FIGS. 3A-3B is a flow chart illustrating a method for using a pressure tapping device positioned within the drive unit of a motor vehicle, such as pressure tapping device 40 of FIGS. 1-2, to activate a brake booster. Instructions for carrying out method 300 and the rest of the methods included herein may be executed by a controller (such as controller 54 of FIG. 2) based on instructions stored on a memory of the controller and in conjunction with signals received from sensors of the engine system, such as the sensors described above with reference to FIG. 2. The controller may employ engine actuators (e.g. pressure tapping device 40) of the engine system to adjust engine operation, according to the methods described below.

At 302, method 300 includes delivering gaseous fuel to the engine for direct injection at the engine cylinders via a fuel line and fuel rail, such as engine 12 via fuel rail 20 and fuel line 23. At 304, the method includes checking for a signal from the brake sensor (e.g., sensor 70) indicative of actuation of the vehicle brake. Then, at 306, the brake signal is compared to a threshold at the controller and a determination whether the signal exceeds the threshold is made. For example, the threshold may be an amount of pressure exerted on the brake pedal (e.g., brake pedal 68 in FIG. 2) by the operator that indicates boost from the brake booster is requested. In one example, the threshold may be zero, such that any actuation of the brake triggers boost from the brake booster. In another example, the threshold may be greater than zero, such that relatively small amounts of braking may be performed manually by the operator without boost. If the sensor detects less pressure exerted on the brake pedal than a threshold amount of pressure, the method continues to 328 and gas continues flowing through the fuel line with the admission line pressure control valve closed. If, however, the detected pressure on the brake pedal is greater than the threshold amount of pressure, the method proceeds to 308.

At 308, the admission line pressure control valve (e.g., valve 41) is at least partially opened, allowing some of the fuel flowing through the fuel line to enter the admission line of the pressure tapping device. At the same time, the fuel line pressure valve (e.g., valve 24) is partially closed and the discharge line valve (e.g., valve 44) is shut. The partial closing of the fuel line pressure valve may have the effect of reducing the fuel flow through the valve by an amount that results in the flow being less than 100% of the flow through the fuel line pressure valve when it is open. By partially closing the fuel line pressure valve, the fuel supply may be throttled, increasing the back-pressure upstream of the fuel line pressure valve and allowing the fuel to flow into the first cylinder of the pressure tapping device. The fuel line pressure valve may be closed by a suitable amount, such as 10% or more, but left open enough to maintain commanded pressure at the fuel rail. An intermediate pressure that is lower than the pressure of the fuel storage reservoir but higher than the ambient pressure is generated at the first cylinder of the pressure tapping device in 308 and transmitted to the second cylinder of the pressure tapping device at 310 via a transmission fluid. The intermediate pressure is transmitted yet again, at 312, from the second cylinder to a working medium. Then, at 314, the pressure of the working medium is measured by a manometer (e.g., manometer 48 in FIG. 2) and sent to the controller. The method, at 316, then determines if the working pressure is equal to or greater than 1 bar above the ambient pressure.

If the pressure is not equal to or greater than 1 bar above ambient pressure, the method proceeds to 330 where the admission line pressure control valve remains at least partially open to continue transferring fuel to the first cylinder and continues to 320 where the working pressure is transferred from the working medium to the brake booster. In some examples, if the pressure does not reach 1 bar above ambient, the fuel line pressure valve may be adjusted to a more closed position. Movement of a brake diaphragm (e.g., the brake diaphragm 66 in FIG. 2) is actuated, generating a pressure differential across the brake diaphragm and generating boost for brake operation. If, however, the pressure in the working medium is at least 1 bar above ambient pressure, the method follows 318 instead. If the pressure is more than 1 bar above ambient, the discharge line valve is opened and the admission line pressure valve is at least partially closed to allow some of the pressure to bleed out through the discharge line valve into the fuel line and lower the pressure in the working medium before continuing to actuating the brake booster at 320. However, if the pressure is equal to 1 bar above ambient, the discharge line valve is closed and the admission line pressure valve is closed.

The method 300 then proceeds to 322 where the controller checks the brake signal sent from the brake sensor and determines if the brake signal is below a threshold. This threshold, as described above, may be, for example, a predetermined amount of pressure exerted on the brake pedal by the operator. If the signal is not below the threshold, the method cycles back to 306 to continue to transfer pressure from the fuel system to the brake booster via the pressure tapping device. If the signal is determined to be below the threshold, the method continues to 326 where the discharge line valve and fuel line pressure control valve are both opened and fuel is flowed to the engine via the fuel line and fuel rail.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an internal combustion engine;
a fuel storage reservoir connected to the internal combustion engine by a fuel line, fuel stored in the fuel storage reservoir at a storage pressure greater than an ambient pressure;
a pressure tapping device comprising a pressure transmitter, which comprises a first cylinder with a first piston and a second cylinder with a second piston having a fluid-carrying connection to the first cylinder, the pressure tapping device including a fluid-carrying connection to the fuel line and configured to transmit a proportion of pressure energy of a fuel to a working medium, physically separate from the fuel, wherein the pressure tapping device comprises an admission line with an admission line pressure control valve and a discharge line with a discharge line valve, wherein a working pressure of the pressure tapping device is measured by a manometer coupled to the admission line pressure control valve; and
a controller storing non-transitory instructions executable to open the admission line pressure control valve and close the discharge line valve to supply fuel from the fuel line to the first cylinder via the admission line, the controller is also in electronic communication with the manometer measuring the working pressure and the instructions are executable to adjust a position of the admission line pressure control valve based on output from the manometer.

2. The system as claimed in claim 1, wherein each of the admission line and the discharge line are coupled to the fuel line.

3. The system as claimed in claim 2, wherein a transmission fluid is located between the first piston and the second piston, wherein the admission line and the discharge line have the fluid-carrying connection to the first cylinder.

4. The system as claimed in claim 3, wherein pressure from the first cylinder is transferred to the working medium via the pressure tapping device, the working medium fluidly coupled to a pressure actuator and wherein a pressure of the working medium is transmitted to the pressure actuator via the fluidic coupling.

5. The system as claimed in claim 4, wherein the pressure actuator is a brake booster.

6. A method for a pressure tapping device comprising a first cylinder having a first piston and a second cylinder having a second piston, wherein the pressure tapping device comprises an admission line with an admission line pressure control valve and a discharge line with a discharge line valve, wherein a working pressure of the pressure tapping device is measured by a manometer coupled to the admission line pressure control valve, wherein the admission line and the discharge line are coupled to a fuel line coupling an engine to a fuel storage reservoir, the method comprising:
supplying fuel to one or more cylinders of the engine via the fuel line coupled to the fuel storage reservoir;
adjust a position of the admission line pressure control valve based on output from the manometer; and
transferring pressure from the fuel storage reservoir to a brake booster actuator via the pressure tapping device.

7. The method of claim 6, wherein transferring pressure from the fuel storage reservoir to the brake booster actuator via the pressure tapping device comprises transferring pressure from the fuel storage reservoir to a pressure-actuated brake booster via the pressure tapping device.

8. The method of claim 6, wherein transferring pressure from the fuel storage reservoir to the brake booster actuator via the pressure tapping device comprises opening the admission line pressure control valve positioned in the admission line fluidically coupling the fuel storage reservoir to the pressure tapping device, thereby supplying fuel from the fuel storage reservoir to the first cylinder of the pressure tapping device.

9. The method of claim 8, wherein transferring pressure from the fuel storage reservoir to the brake booster actuator via the pressure tapping device further comprises pressurizing a working fluid of the pressure tapping device via a transmission fluid coupled between the first cylinder and the second cylinder of the pressure tapping device, the working fluid housed in the second cylinder and fluidically coupled to the brake booster actuator.

10. The method of claim 9, further comprising depressurizing the working fluid by opening a discharge line valve positioned in the discharge line fluidically coupled to the first cylinder, thereby flowing fuel from the first cylinder to the fuel line, where the fuel is gaseous fuel.

11. A system, comprising:
a pressure tapping device coupled between a gaseous fuel tank and a gaseous fuel rail, the pressure tapping device comprising a first cylinder having a first piston and a second cylinder having a second piston, the first piston and the second piston fluidically coupled via hydraulic fluid;
a brake booster fluidically coupled to the second cylinder; and
a controller storing instructions executable to:
responsive to detecting actuation of a brake pedal, open an admission line pressure control valve to supply gaseous fuel from the gaseous fuel tank to the first cylinder, the gaseous fuel in the first cylinder actuating the first piston, thus transmitting pressure from the gaseous fuel to the brake booster via the hydraulic fluid and the second piston; and
responsive to detecting release of the brake pedal, open a discharge line valve to supply the gaseous fuel in the first cylinder to the gaseous fuel rail.

12. The system of claim 11, wherein the gaseous fuel tank is configured to store gaseous fuel at a first pressure, and wherein the gaseous fuel rail is maintained at a second pressure, lower than the first pressure.

13. The system of claim 11, wherein when the brake pedal is actuated, the instructions are executable to adjust a position of the admission line pressure control valve based on feedback from a pressure sensor coupled to the second piston.

14. The system of claim 11, wherein the instructions are executable to detect actuation of the brake pedal based on output from a brake sensor exceeding a threshold value.

15. The system of claim 14 wherein the instructions are executable to detect release of the brake pedal based on the output from the brake sensor subsequently decreasing.

16. The system of claim 14, wherein the instructions are executable to close the admission line pressure control valve responsive to a pressure of the second cylinder as detected by the pressure sensor reaching a threshold pressure.

\* \* \* \* \*